Aug. 26, 1941.   C. A. VATTER   2,253,875
SPEED CONTROLLER AND BRAKE
Filed May 28, 1938   2 Sheets-Sheet 1

INVENTOR.
CLAUDE A. VATTER.
BY
ATTORNEY.

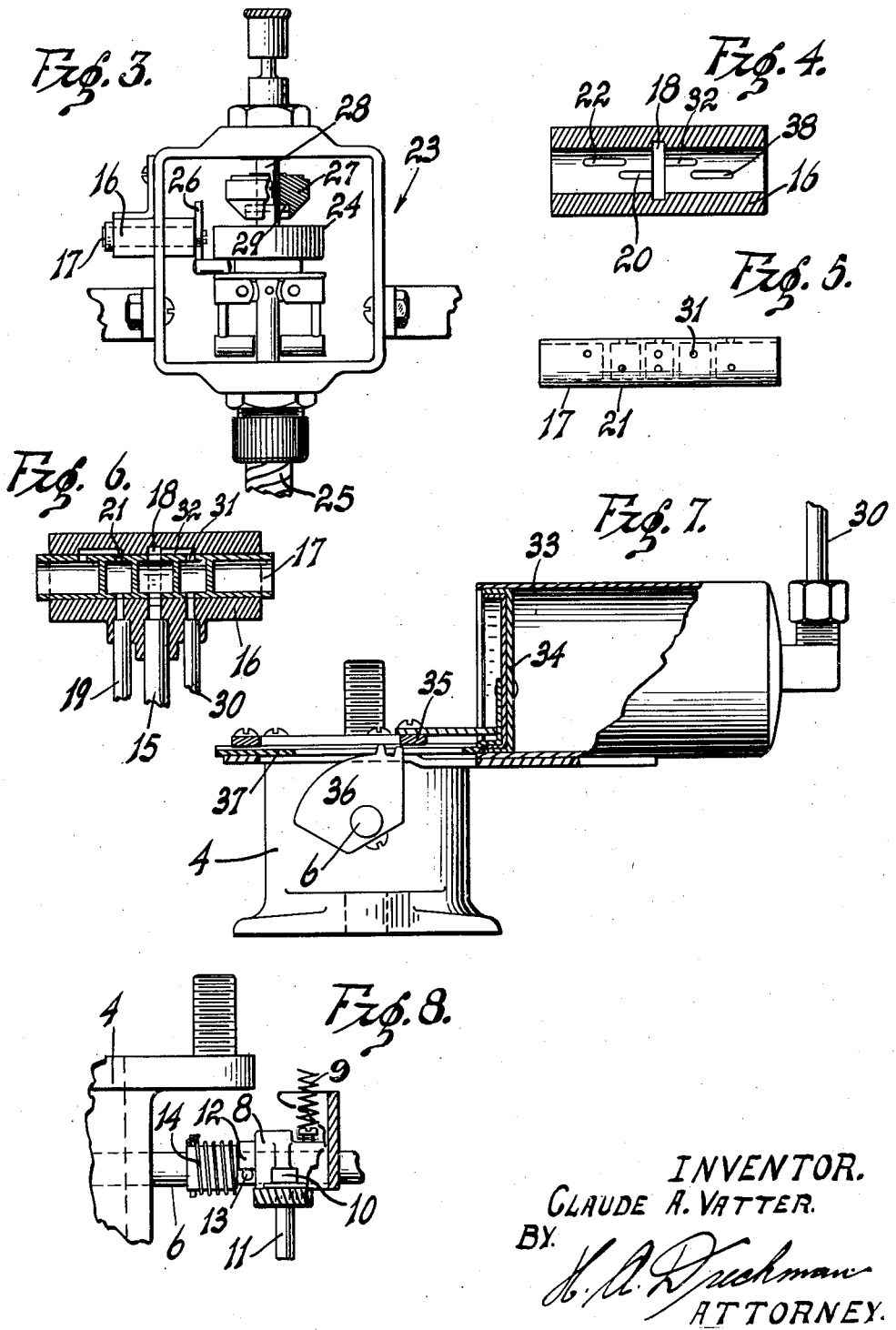

Patented Aug. 26, 1941

2,253,875

UNITED STATES PATENT OFFICE 2,253,875

SPEED CONTROLLER AND BRAKE

Claude A. Vatter, Long Beach, Calif.

Application May 28, 1938, Serial No. 210,633

9 Claims. (Cl. 180—82.1)

This invention relates to a vehicle speed controller and brake when the fuel supply to the engine is governed by the speed of the vehicle and over-speeding of the vehicle will cause the controller to first partially shut off the fuel supply to the engine and then on further increasing the speed of the vehicle, the throttle of the intake manifold is entirely closed to provide a braking effect on the engine.

An object of my invention is to provide a novel speed controller and brake in which a separate control valve is opened and closed by means of a motor, the motor in turn being controlled by a speed sensitive device, and the speed sensitive device further controlling a means of positively closing the throat of the intake manifold of the engine.

A further object is to provide a novel speed controller and brake of the character stated in which a vacuum actuated motor operates a valve, the vacuum motor being controlled in its movement by a speed sensitive device and a second vacuum actuated cylinder operating to completely close the throat of the intake manifold, the second vacuum cylinder being also controlled from the same speed sensitive device.

A further object is to provide a novel structure of the character stated in which a speed sensitive device operates a valve whereby a vacuum is drawn in a motor to control a throttle valve, the same valve also controlling a second vacuum cylinder to completely close the throttle to the intake manifold on over-speed of a vehicle.

Other objects, advantages and features of invention may appear from the accompanying drawings, the subjoined detailed description and the appended claims.

In the drawings

Figure 3 is a side elevation of the speed sensitive device.

Figure 4 is a longitudinal sectional view of the vacuum valve.

Figure 5 is a plan view of the same.

Figure 6 is a longitudinal, sectional view of the vacuum valve and the various pipes connected thereto.

Figure 7 is a side elevation, partly in section, of the vacuum cylinder closure of the throttle of the intake manifold.

Figure 8 is a fragmentary side elevation of the valve shaft and control therefor.

Figure 1:
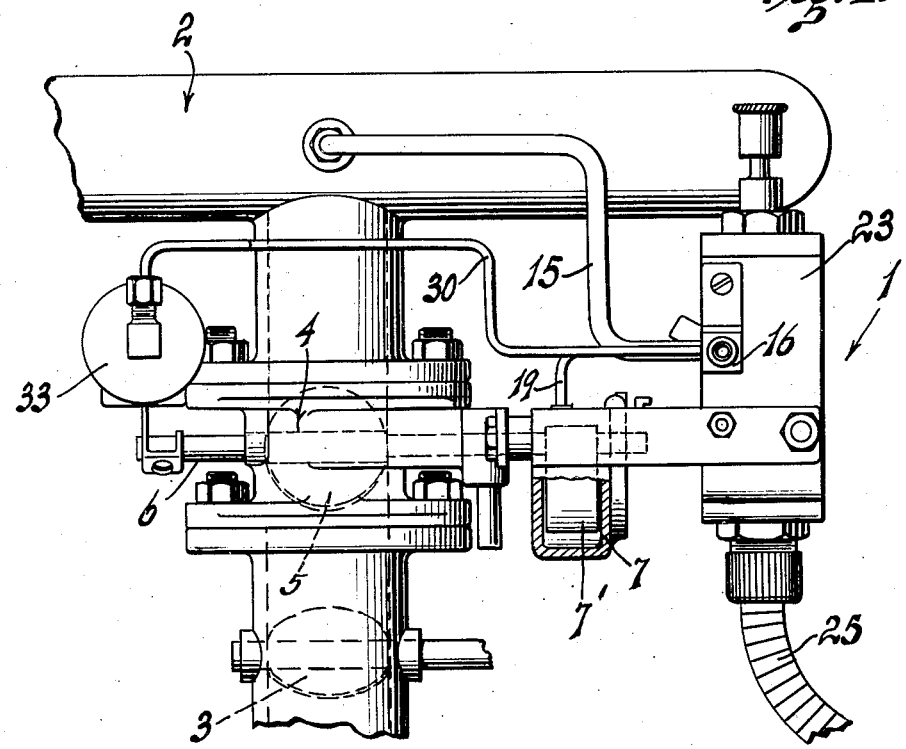
Figure 1 is a side elevation of my speed controller and brake as mounted on and adjacent to the intake manifold of an engine.
Figure 2:
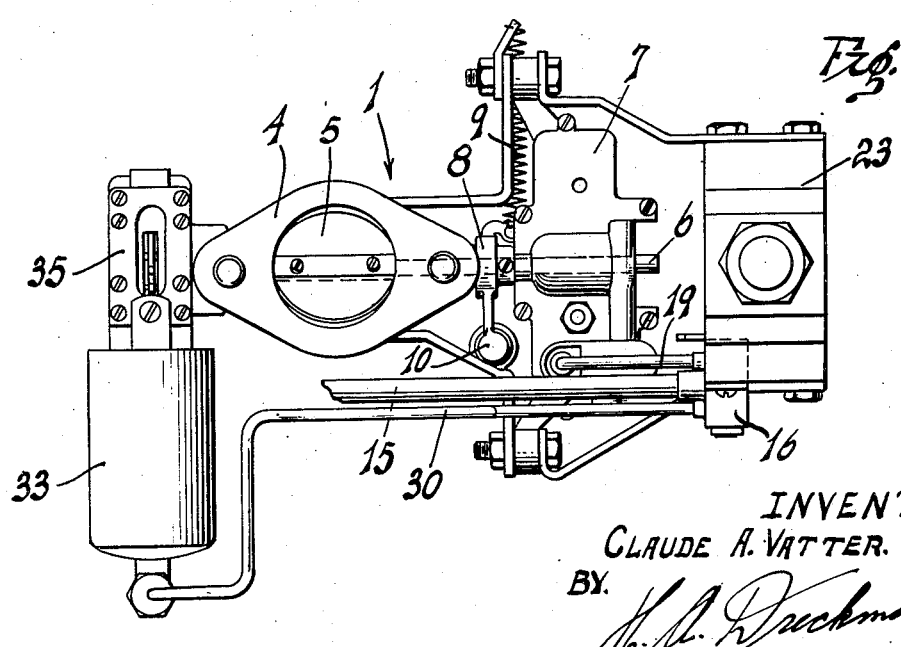
Figure 2 is a top plan view of the speed controller and brake.

Referring more particularly to the drawings, my vehicle speed controller and brake effectively controls the maximum speed of a vehicle within close limits by reason of a two fold action of the speed sensitive device.

The speed sensitive device first operates through a motor to partially close the intake manifold to the engine by permitting a slight by-pass of fuel similar to the idling speed requirements of an engine. If the speed of the vehicle further increases as, for example, going down a long hill, the speed sensitive device further operates to actuate, through a valve, a cylinder which completely closes the control valve in the intake manifold, thus effectively braking the engine and, therefore, the vehicle.

The speed controller 1 is mounted between the carburetor, not shown, and the intake manifold 2 of an engine, and above the manually controlled throttle valve 3. The speed sensitive device of the controller is driven from the drive shaft, transmission or wheels of the vehicle as will be further described.

My device comprises a fitting 4 which is mounted in the manifold above the manual throttle valve 3 and is suitably flanged so as to be bolted to the usual flanges found on a vehicle engine, substantially as shown. A throttle valve 5 is mounted in the fitting 4 on a shaft 6; this shaft is journaled in the fitting and extends horizontally and projects out of the fitting. A motor 7 is mounted on the fitting 4 and the shaft 6 extends into this motor and is operated thereby. The motor is preferably of the vacuum type like a windshield wiper motor in which a piston is moved from side to side under the urge of a partial vacuum created in the engine. The piston 7' of the motor is fixedly attached to the shaft 6 and, thus, it will be evident that movement of the piston will cause the shaft to rotate thereby swinging the valve 5 from open to closed position.

The type of motor here shown is used in windshield wipers in which a partial vacuum is directed alternately on each side of the piston to thus cause the piston to oscillate in the housing.

A clamp 8 is attached to the shaft 6 and a spring 9 attached to the clamp normally holds the valve 5 in closed up position. The closed position of the valve is determined by a finger 10 which engages the head of a stop pin 11. By changing the stop pin 11 to one having a head of different thickness, the amount of opening of the valve 5 can be determined as far as the initial closing of this valve is concerned by the motor 7.

A shoulder 12 on the clamp 8 engages the pin 13 on the shaft 6 when the valve 5 is being swung into open position under the urge of the spring 9. A coil spring 14 yieldably presses the shaft 6 against the shoulder 12. Further rotation of the shaft 6 is permitted against the tension of the spring 14 when the valve 5 is completely closed by a means to be further described.

A vacuum tube 15 extends from the intake manifold of the engine to the valve chest 16. Within the valve chest, I provide a control cylinder 17 which rotates within the valve chest to control various ports under the urge of the speed sensitive device, to be further described. The pipe 15 extends to the center of the valve chest 16 and evacuates the annular chamber 18, a control pipe 19 extends from the valve chest 16 to the motor 7. A horizontal channel 20 extends from the chamber 18 and when the port 21 of the cylinder 17 coincides with the channel the pipe 19 will be evacuated to operate the motor 7, thus swinging the shaft 6 and partially closing the control valve 5.

A second or air channel 22 is provided in the chest 16 and when the port 21 coincides with this channel, air is admitted to the pipe 19 so that the spring 9 can readily rotate the shaft 6 to reopen the valve 5. The cylinder 17 is rotated to its various positions by the speed sensitive device 23, which includes a vertically mounted fly ball governor 24. The governor is driven through the shaft 25 from the wheels, the transmission or the motor of the vehicle. A finger 26 secured to the cylinder 17 engages the governor 24 and the governor thus rotates the cylinder to control the motor and, therefore, the speed of the vehicle. As thus far described, the governor will prevent overspeed of the vehicle, but since the throat to the intake manifold is only partly closed by the valve 5, the vehicle could gradually build up speed and travel above the governed speed. To overcome this contingency, I provide a motor brake which is also controlled by the governor 24 through the valve chest 16 in the following manner:

When the governor 24 rises above the position where the valve 5 will be initially closed, it engages an auxiliary weight 27, thus preventing the governor from rising too high on the shaft 28. The auxiliary weight 27 is limited in its downward movement by the pin 29 in the shaft 28. When the governor rises to a point where the auxiliary weight is engaged, the cylinder 17 will be rotated to a point where the vacuum is directed into a pipe 30. The ports 31 in the cylinder coincide with the groove 32 in the chest 16, thereby directing vacuum into the pipe 30. The cylinder 33 is thus evacuated and the piston 34 in the cylinder is moved inwardly to move the slide 35 over the sector 36 attached to the shaft 6. The teeth on this sector are engaged by the shoulder 37 of the slide thereby rotating the shaft 6 and completely closing the valve 5. All air is thus prevented from passing into the engine and the engine, therefore, acts as a pump or compressor and will thus provide an effective brake for the vehicle. The additional rotation of the shaft 6 as above described occurs against the tension of the spring 14 and the pin 13 will be moved away from its shoulder 12 until the governor moves downwardly on its shaft 28 at which time the vacuum is cut off from the pipe 30 and air is then admitted into the pipe 30 through the groove 38 in the chest 16; whereupon, the piston 34 can move outwardly in the cylinder thus releasing the shaft 6 and permitting the valve 5 to again partly open.

The operation of the device is as follows:

With the vehicle operating, the governor 24 starts to move upwardly on the shaft 28 and when the vehicle reaches the governed speed, the cylinder 17 will be rotated to a position to admit vacuum into the pipe 19. The air motor 7 is thus operated to swing the shaft 6 and close the valve 5 to what might be termed an idling position. If the speed of the vehicle still increases, the governor 24 will continue to rise on the shaft 28 and will engage the auxiliary weight 27 in additional upward movement of the governor will open the ports to the pipe 30 permitting the cylinder 33 to be evacuated. The piston 34 in the cylinder 33 will then pull its slide 35 inwardly and the sector 36 will be engaged to further rotate the shaft 6 and completely close the valve 5, so that no air at all can enter the intake manifold 2 of the engine.

Having described my invention, I claim:

1. A vehicle speed controller comprising a valve, an intake manifold of an engine in which the valve is mounted, an air motor, a piston in the air motor operatively connected to the valve to open and partly close the same, a speed sensitive device of the weight type mounted adjacent said motor, drive means extending from the vehicle to the speed sensitive device whereby the speed sensitive device is driven as the vehicle operates, air control means operable by the speed sensitive device and connected to said speed sensitive device, said control means being adapted and arranged to direct air from the motor, whereby the piston of said motor is caused to move and partly close the valve, an air cylinder, said control means also controlling the air cylinder, and means operatively connecting the air cylinder to the valve whereby the valve is completely closed on operation of the air cylinder.

2. A vehicle speed controller comprising a valve, an intake manifold of an engine in which the valve is mounted, a speed sensitive device of the weight type, drive means for said speed sensitive device extending from the vehicle thereto, said speed sensitive device being driven as the vehicle operates, an air valve operable by the speed sensitive device and connected thereto, an air motor, said air motor being operably connected to the valve in the manifold of the engine and adapted to partly close the same, an air cylinder, said air cylinder being operatively connected to the air valve and controlled thereby, the air cylinder being operatively connected to the valve in the manifold of the engine and adapted to completely close said valve.

3. A vehicle speed controller comprising a valve, an intake manifold of an engine in which the valve is mounted, a speed sensitive device of the weight type, drive means for the speed sensitive device extending from the vehicle and adapted to operate the speed sensitive device as the vehicle operates, an air control valve, control means connecting the speed sensitive device and the air control valve, an air motor, said air motor being connected to the first-named valve to open and partly close the same, an air cylinder, means operatively connecting the air cylinder and the first-named valve to further close said first-named valve, and conduits extending from the air control valve to the air motor and the air cylinder.

4. A vehicle speed controller comprising a valve, an intake manifold of an engine in which the valve is mounted, a speed sensitive device of the weight type, drive means extending from the vehicle to the speed sensitive device whereby the speed sensitive device is operated as the vehicle operates, an air motor operatively connected to the valve and adapted to open and partly close said valve, an air cylinder, means operatively connecting the air cylinder to the valve whereby the valve is completely closed on operation of the air cylinder, an air control valve, means operatively connecting the air control valve and the speed sensitive device, and a conduit extending from the air control valve to the air motor, and a second conduit extending from the air control valve to the air cylinder whereby the air cylinder and the air motor are actuated.

5. A vehicle speed controller comprising a valve, an intake manifold of an engine in which the valve is mounted, a speed sensitive device of the weight type, drive means extending from the vehicle to the speed sensitive device whereby the speed sensitive device is actuated as the motor operates, an air control valve, control means connecting the speed sensitive device and the air control valve, an air motor, said air motor being connected to the first-named valve to open and partly close the same, an air cylinder, means operatively connecting the air cylinder and the first-named valve to further close said first-named valve, and conduits extending from the air control valve to the air motor and air cylinder, and an auxiliary weight on the speed sensitive device engageable by weights of the speed sensitive device during a part of the movement of said speed sensitive device.

6. A vehicle speed controller comprising a valve, an intake manifold of an engine in which the valve is mounted, a speed sensitive device of the weight type, drive means extending from the vehicle to the speed sensitive device whereby the speed sensitive device is operated as the vehicle operates, an air motor operatively connected to the valve and adapted to open and partly close said valve, an air cylinder, means operatively connecting the air cylinder to the valve whereby the valve is completely closed on operation of the air cylinder, an air control valve, means operatively connecting the air control valve and the speed sensitive device, and a conduit extending from the air control valve to the air motor, and a second conduit extending from the air control valve to the air cylinder whereby the air cylinder and the air motor are actuated, and an auxiliary weight on the speed sensitive device engageable by weights of the speed sensitive device during a part of the movement of said speed sensitive device.

7. A vehicle speed controller comprising a valve, an intake manifold of an engine in which the valve is mounted, a fly-ball governor, drive means extending from the vehicle to the fly-ball governor, an air control valve, means connecting the fly-ball governor and the air control valve whereby movement of the fly-ball governor will actuate the valve, an air motor, means attaching the air motor to the first-named valve whereby operation of the air motor will open and partly close the valve, an air cylinder, means operatively connecting the air cylinder and the first-named valve whereby said valve will be completely closed on operation of the air cylinder, and conduits extending from the air control valve to the air motor and to the air cylinder.

8. A vehicle speed controller comprising a valve, an intake manifold of an engine in which the valve is mounted, a fly-ball governor, drive means extending from the vehicle to the fly-ball governor, an air control valve, means connecting the fly-ball governor and the air control valve whereby movement of the fly-ball governor will actuate the valve, an air motor, means attaching the air motor to the first-named valve whereby operation of the air motor will open and partly close the valve, an air cylinder, means operatively connecting the air cylinder and the first-named valve whereby said valve will be completely closed on operation of the air cylinder, and conduits extending from the air control valve to the air motor and to the air cylinder, and an auxiliary weight on the speed sensitive device engageable by weights of the speed sensitive device during a part of the movement of said speed sensitive device.

9. A vehicle speed controller comprising a valve, an intake manifold of an engine in which the valve is mounted, a fly-ball governor, drive means for the fly-ball governor extending from the vehicle whereby the fly-ball governor is operated as the vehicle operates, an air control valve, means connecting the fly-ball governor and the air control valve whereby movement of the fly-ball governor will actuate the valve, an air motor, means attaching the air motor to the first-named valve whereby operation of the air motor will open and partly close the first-named valve, an air cylinder, a piston in the air cylinder, a slide mounted on the piston, a sector attached to the first-named valve, there being a lost motion connection between the sector and the slide, conduits extending from the air control valve to the air motor and to the air cylinder, said air cylinder being adapted and arranged to completely close the first-named valve on operation of said air cylinder when the engine overspeeds.

CLAUDE A. VATTER.